(12) United States Patent
Jackson et al.

(10) Patent No.: US 8,942,957 B2
(45) Date of Patent: Jan. 27, 2015

(54) MANUFACTURING SYSTEM PERFORMANCE ANALYSIS TOOL SOFTWARE ARCHITECTURE

(75) Inventors: Craig A. Jackson, Ortonville, MI (US); Jonathan H. Owen, Beverly Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 925 days.

(21) Appl. No.: 12/910,910

(22) Filed: Oct. 25, 2010

(65) Prior Publication Data

US 2011/0066274 A1 Mar. 17, 2011

Related U.S. Application Data

(63) Continuation-in-part of application No. 11/198,207, filed on Aug. 5, 2005, now Pat. No. 7,844,420.

(60) Provisional application No. 60/649,154, filed on Feb. 2, 2005.

(51) Int. Cl.
- *G06F 17/10* (2006.01)
- *G06Q 10/06* (2012.01)
- *G05B 17/02* (2006.01)
- *G05B 19/418* (2006.01)

(52) U.S. Cl.
CPC ............... *G06Q 10/06* (2013.01); *G05B 17/02* (2013.01); *G05B 19/4188* (2013.01); *G05B 2219/31341* (2013.01)
USPC ............................................................. 703/2

(58) Field of Classification Search
CPC .. G06F 17/5018; G06F 17/50; G06F 2217/10; G06Q 10/06
USPC ............................................................. 703/2
See application file for complete search history.

(56) References Cited

U.S. PATENT DOCUMENTS

| | | | |
|---|---|---|---|
| 5,229,948 A | 7/1993 | Wei et al. | |
| 5,987,426 A * | 11/1999 | Goodwin, III | 705/21 |
| 6,405,366 B1 | 6/2002 | Lorenz, Sr. et al. | |
| 6,556,882 B1 | 4/2003 | Conboy et al. | |
| 7,213,208 B2 | 5/2007 | Reichel et al. | |
| 2002/0087741 A1* | 7/2002 | Ing et al. | 709/328 |
| 2003/0028863 A1* | 2/2003 | Reichenthal | 717/135 |
| 2004/0225952 A1 | 11/2004 | Brown et al. | |
| 2006/0010452 A1 | 1/2006 | Sattler et al. | |
| 2006/0173568 A1 | 8/2006 | Jackson et al. | |

OTHER PUBLICATIONS

Felix T.S. Chan, Bing Jiang, Nelson K.H. Tang, The development of intelligent decision support tools to aid the design of flexible manufacturing systems, International Journal of Production Economics, vol. 65, Issue 1, Apr. 1, 2000, pp. 73-84.*

Silberschatz et al., Operating system concepts, 2002, John Wiley and sons, 6th edition, pp. 12-13, 536-537.*

(Continued)

*Primary Examiner* — Kamini S Shah
*Assistant Examiner* — Luke Osborne

(57) ABSTRACT

A method for analyzing performance of a manufacturing system includes constructing a descriptive representation of the manufacturing system, selectively binding the descriptive representation to an analytical module using a software isolation layer, invoking the analytical module, and utilizing an output of the analytical module using an end-user application program configured to utilize the output.

21 Claims, 1 Drawing Sheet

(56) References Cited

OTHER PUBLICATIONS

Zimmermann, A., TimeNET—An Integrated Modeling and Performance Evaluation Tool for Manufacturing Systems, Technische Universitat Berlin, Institut fur Technische Informatik Franklinstr. 28/29, Sekr. FR 2-2, 10587 Berlin, Germany, 6 pages 1998.

"MSC.Nastran 2001 Release Guide", MSC.Software Corporation, 815 Colorado Boulevard, Los Angeles, CA 90041-1777, 2001 570 pages.

Alden, J. M., "General Motors Increases Its Production Throughput", Jan. 2006, Interfaces, vol. 36, No. 1, pp. 6-25.

Fu, M. C., Optimization for Simulation: Theory vs. Practice, 2002, INFORMS Journal on Computing, vol. 14, No. 3, 25 Pages.

McLean, C., "The IMS Mission Architecture for Distributed Manufacturing Simulation", 2000, Proceedings of the 2000 Winter Simulation Conference, pp. 1539-1548.

"ILOG AMPL CPLEX System Version 9.0 User's Guide", Standard (Command-line) Version Including CPLEX Directives, Sep. 2003, ILOG S.A., pp. 1-92.

Holmes, D., "AMPL (A Mathematical Programming Language) at the University of Michigan Documentation", Version 2, Aug. 1995, pp. 1-16.

Pruessner, A., "GAMS: A High Performance Modeling System for Large-Scale Modeling Applications", Oct. 2004, INFORMS, pp. 1-44.

Drud, A. S., "Replaceable Solvers ini GAMS", ARKI Consulting and Development, Sep. 2003, Workshop on Optimization/Modeling/Applications—15 Years of GAMS Development—60 Years Alex Meeraus, pp. 1-40.

* cited by examiner

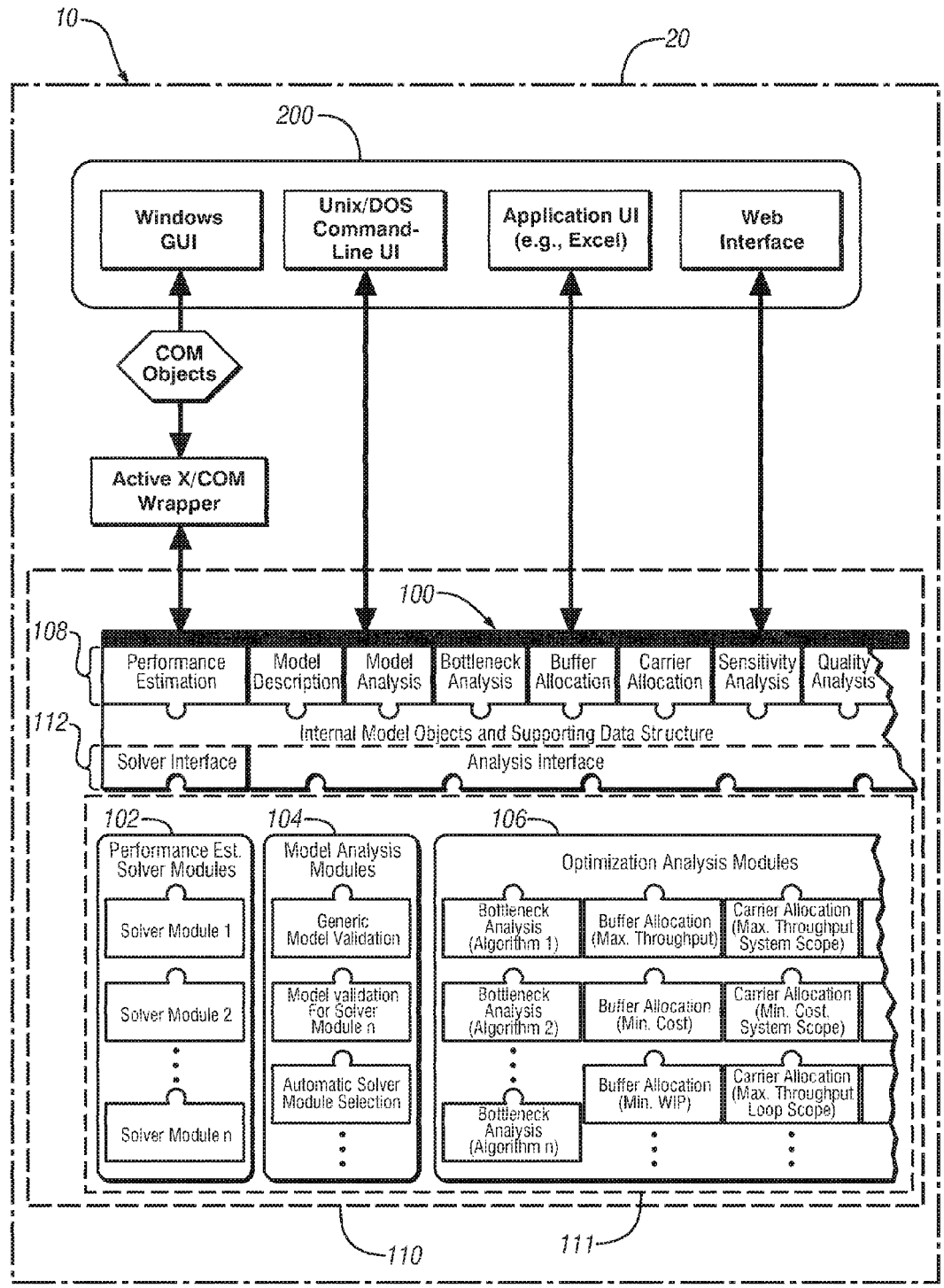

MANUFACTURING SYSTEM PERFORMANCE ANALYSIS TOOL SOFTWARE ARCHITECTURE

CROSS REFERENCE TO RELATED APPLICATIONS

This application is a continuation-in-part of application Ser. No. 11/198,207, filed Aug. 5, 2005, which claims the benefit of U.S. Provisional Application No. 60/649,154, filed Feb. 2, 2005, both of which are incorporated herein by reference.

TECHNICAL FIELD

The present disclosure is related to manufacturing systems. More particularly, the disclosure is related to software-based manufacturing system performance analysis.

BACKGROUND

The statements in this section merely provide background information related to the present disclosure and may not constitute prior art.

Manufacturing systems comprise machines, transportation elements, computers, storage buffers, people and other resources that are used together for manufacturing. One characteristic of modern manufacturing systems is flexibility. Flexibility in manufacturing systems is necessary to meet, for example, variability in production volume and mix requirements and production changeovers as a result of new product introductions. With frequent new product introductions, product life cycles are shortened and so, too, are process lifetimes. This leads to frequent manufacturing system changes and the necessity for corresponding redesigning, rebuilding, retooling and reconfiguring of the manufacturing system transfer lines to accommodate such changes. Therefore, manufacturing enterprises are continually analyzing their manufacturing systems.

Manufacturing systems have progressed to a point where disciplined design and management tools are commonplace. Preferably, manufacturing systems are designed, configured and managed using tools that include input not only from product design engineering, but also of constraints and capabilities from diverse disciplines such as supply chain management, sales, marketing and forecasting, labor management, capital asset management and allocation, machine maintenance and manufacturing engineering, for example. All such disciplines can have pronounced effects upon the manufacturing system and are similarly significantly affected by the manufacturing system. All of these various disciplines benefit from manufacturing system analysis tools. However, the applications and uses tend to be specialized and diverse in accordance with the specific needs and requirements of the various interested disciplines. For example, a manufacturing engineer may require sophisticated "what-if" capabilities to design a new manufacturing system, while another user, responsible for day-to-day improvements of a particular transfer line operation, may need the ability to process performance data obtained through automatic data collection. Yet another user interested in enterprise-wide analysis may require web-based access to compare the performance of production lines at several different plants. Though the exemplary applications differ, the various disciplines may require common analysis capabilities.

Modern manufacturing system analysis tools manifest in the form of sophisticated computer-based modeling and analysis algorithms. The diverse application and use requirements from the various interested disciplines have influenced development and evolution of such tools into highly-integrated, end-user applications characterized by consolidated user interfaces and modeling and analysis capabilities. As such, these tools tend to be tied to specific computing platforms thus making widespread enterprise deployment both difficult and costly. Cross-application or inter-disciplinary utilization of modeling and analysis capabilities of such highly integrated tools is also inherently cumbersome, thus resulting in duplication of efforts and costs in the development of non-common tools and their underlying analysis capabilities.

SUMMARY

A manufacturing system performance analysis tool software architecture includes a modeling isolation layer and a plurality of analysis modules. The isolation layer includes an application program interface, internal object constructor(s), and an analysis module interface. The application program interface enables application program interaction, such as from a variety of end-user application programs in constructing user objects. Internal objects corresponding to the user objects are generated by internal object constructors. The analysis module interface selectively binds the internal analysis objects to certain ones of the analysis modules. In accordance with one aspect of the disclosure, the user objects include a model class for providing the descriptive representation of a manufacturing system, and a solver class for use in conjunction with the model class in invoking solver-based analyses. Analysis modules may include: model analysis modules for providing, for example, model validations and solver selections; solver modules for providing, for example, various performance estimations such as throughput; and optimization analysis modules for providing, for example, such higher-level analyses of the manufacturing system as relates to reconfigurations and resource allocations to achieve predefined performance objectives.

A manufacturing system performance analysis tool software architecture includes an application program interface for providing user access to manufacturing system modeling and analysis functions. Modeling functions include user model object construction and system description utilizing a respective set of predefined user selectable methods. User model object construction implicitly invokes corresponding internal model object construction. Analysis functions include user solver object construction and system model analysis utilizing a respective set of predefined user selectable methods. User solver object construction implicitly invokes corresponding internal solver object construction. The manufacturing system performance analysis tool software architecture further includes an analysis module interface for selectively coupling each internal solver object to one of a plurality of discrete solver modules in accordance with the construction of the internal solver object. The analysis functions may further include user model analysis object construction and system model analysis utilizing a respective set of predefined user selectable methods. User model analysis object construction implicitly invokes corresponding internal model analysis object construction. The analysis module interface is further used for selectively coupling each internal model analysis object to one of a plurality of discrete model analysis modules in accordance with the construction of the internal model analysis object. The analysis functions may further include user optimization analysis object construction and system model analysis utilizing a respective set of predefined user selectable methods. User optimization analysis object construction implicitly invokes corresponding internal optimization analysis object construction. The analysis module interface is further used for selectively coupling each internal optimization analysis object to one of a plurality of discrete optimization analysis modules in accordance with the construction of the internal optimization analysis object. In this latter inclusion of user optimization analysis object construction, the analysis module interface is further used for iterative coupling ones of the plurality of discrete solver modules to the discrete optimization analysis modules in accordance with the constructions of the internal solver object and the internal optimization analysis object.

A method for analyzing performance of a manufacturing system includes constructing a descriptive representation of the manufacturing system, selectively binding the descriptive representation to an analytical module using a software isolation layer, invoking the analytical module, and utilizing an output of the analytical module using an end-user application program configured to utilize the output.

BRIEF DESCRIPTION OF THE DRAWINGS

One or more embodiments will now be described, by way of example, with reference to the accompanying drawings, in which:

The FIGURE illustrates an extensible, multi-layer software architecture for a manufacturing system performance tool, in accordance with the disclosure.

DETAILED DESCRIPTION

Referring now to the drawings, wherein the showings are for the purpose of illustrating certain exemplary embodiments only and not for the purpose of limiting the same, the FIGURE illustrates an extensible, multi-layer software architecture for a manufacturing system performance tool, in accordance with the disclosure.

The present disclosure includes an extensible, multi-layer software architecture for a manufacturing system performance analysis tool characterized by substantial decoupling of end-user applications and the underlying capabilities of the manufacturing system analysis tool. An isolation layer includes interfaces to user applications for accessing analysis capabilities and reporting analysis results. The isolation layer also includes interfaces to and between analytical modules of varying function, scope and abstraction to effect the analyses specified in accordance with the end-user applications.

The architecture provides a broadly adaptable interface to end-user applications via an application program interface (API) and isolation of the underlying analysis capabilities via object-based processes of the isolation layer managing messages, data and objects.

The application program interface (API) enables user construction of manufacturing system models, simulations and various analyses corresponding thereto. In the present exemplary embodiment, the underlying analysis capabilities include performance solver software modules for effecting a variety of solver algorithms and methods, model analysis software modules for validating the user defined manufacturing system models and assisted selection of the various solver modules, and manufacturing system optimization software modules for analysis of various manufacturing system model constructs through iterative processes utilizing the user defined manufacturing system models and the solver capabilities of the solver modules. Preferably, shared library structures are populated with the various analysis modules, object classes, corresponding methods and data structures.

Given this architecture wherein the underlying analysis capabilities are decoupled from the end-user applications, modular and library-based, the manufacturing system performance analysis tool is readily extensible. Analysis module changes, for example from underlying algorithm improvements, can be effected without affecting end-user applications, analysis module interfaces and, in most instances, without affecting the application program interfaces. Similarly, end-user application additions or changes, for example changes to the relational database used to store model data, can be readily effected without affecting the analysis capabilities of the analysis modules. This facilitates deployment and a high degree of availability of common analysis capabilities across a manufacturing enterprise without strictly defining or limiting the available end-user applications or the ability to port the analysis capabilities across a variety of computing platforms or problem domains. The architecture also enables distribution of the manufacturing system performance analysis tool across multiple computers using a network. For example, the isolation layer and analysis modules may reside on separate computers and utilize distributed grid computing and/or parallel processing.

As shown in the FIGURE, a manufacturing system performance analysis tool software architecture 110 includes a modeling isolation layer 100, which provides a manufacturing system modeling language in the form of a functional application programming interface (API) 108. Architecture 110 also includes analysis modules 111 preferably comprising one or more of solver analysis modules 102, model analysis modules 104, and optimization analysis modules 106.

The application programming interface (API) 108 provides access to object-based libraries that can be called directly by any of a variety of application programs 200, examples of which are separately labeled in the FIGURE. Through the application program interface (API) 108, a user is able to construct different classes of user objects with available methods. Preferably, all of the class methods available are characterized by return types and parameter types that are restricted to certain standard data types (e.g. those provided by the ANSI C/C++ programming languages). This restriction enables widespread accessibility in that the data types available to most current applications and programming languages can be mapped directly into these standard data types.

At the most basic level of utility of the manufacturing system performance analysis tool, the user object construction includes abstract model class objects and abstract solver class objects. For each abstract class object, the modeling isolation layer 100 provides a corresponding internal object allocator, which generates internal objects which implement the abstract interface defined by the respective abstract user class. Model class user objects enable the descriptive representation of a manufacturing system (e.g. physical layout, workstation operating characteristics, and job flow behavior) including systems of widely varying degrees of complexity, specialty, detail and abstraction in accordance with the particular end-user application program 200 requirements, Solver class user objects are used in conjunction with the model class user objects in the invocation of solver-based analyses of the manufacturing system model. Each solver class user object utilizes an instance of an underlying solver module 102, which provides the actual solver analysis capabilities. The solver class user object is not itself directly bound to any solver module 102. Instead, the corresponding internal solver object allocated within the modeling isolation layer transforms and marshalls data between the user application(s) 200 and the underlying solver module. As such, the resultant solver class internal object is bound to an appropriate solver module 102 for effecting the desired performance estimation and data transfers across the solver interface.

Solver analysis modules 102 are also known as solvers and provide, for example, various performance estimation functions and capabilities such as production throughput estimations in accordance with the manufacturing system model definition. An exemplary solver might be able to examine a manufacturing system model and make a static assessment of the model's expected throughput capabilities using data contained within the model. Certain solvers may provide relatively quick results with relatively wide confidence factors whereas other solvers may provide results with tight confidence factors at the expense of relatively long run times. Certain solvers may be preferred or required for particular manufacturing system models whereas other solvers may be more generally applicable to any variety of manufacturing system model constructed in accordance with the available modeling capabilities provided through the application program interface (API). As a specific example of the analysis module interfaces 112 within modeling isolation layer 100, a solver interface defines the protocols by which the solvers 102 interact with the modeling isolation layer 100. The modeling isolation layer 100 includes a solver base class from which all solvers 102 are derived. New solvers which implement the existing solver interface can be developed and readily integrated within a library structure. Each solver may be implemented, for example, in shared link libraries (e.g. DLL file in a Microsoft Windows® platform, SO file in a UNIX® platform, etc.) or as a network-enabled service in a distributed environment.

Analogous to the model class and solver class user object construction described herein above, a user—through the application program interface (API) 108—is able to construct model analysis user objects with available methods. Again, it is preferred that all of the class methods available are characterized by return types and parameter types that are restricted to certain standard data types as set forth herein above. These model analysis class user objects are used in the invocation of model analyses of the manufacturing system model. Each model analysis user object utilizes an underlying model analysis module 104. However, as described for solver class objects herein above, the model analysis class user object is not itself directly bound to any model analysis module 104. Instead, an internal object allocator within the modeling isolation layer provides model analysis internal objects corresponding to the model analysis user objects. Each internal model analysis object provides an implementation of the interface defined by the respective abstract user class, transforming and marshalling data between the user application(s) 200 and the underlying model analysis module(s) 104. The resultant model analysis class internal object is then bound to an appropriate model analysis module 104 for effecting the desired model analysis and data transfers across the analysis interface.

Model analysis modules 104 provide, for example, model validation and solver selection functions and capabilities. Similar to the solver interface, the analysis interface defines the protocols by which the model analysis modules 104 interact with the isolation layer 100. The isolation layer 100 includes a model analysis base class from which all model analysis modules 104 are derived. New model analysis modules which implement the existing model analysis interface can be developed and readily integrated within a library architecture or network-enabled service as described herein above with respect to the solver module implementation.

In similar fashion to the prior descriptions of user and internal object constructions in model, solver and model analysis classes, the user is able to construct optimization analysis user objects with available methods accessible through the application program interface (API) 108. Again, it is preferred that all of the class methods available are characterized by return types and parameter types that are restricted to certain standard data types. These optimization analysis class user objects are used in the invocation of optimization analyses of the manufacturing system model. Each optimization analysis class user object utilizes an underlying optimization analysis module 106. However, the optimization analysis class user object is not itself directly bound to any optimization analysis module 106. Instead, an internal object allocator within the modeling isolation layer provides optimization analysis internal objects corresponding to the optimization analysis user objects. Each internal optimization analysis object provides an implementation of the interface defined by the respective abstract user class, transforming and marshalling data between the user application(s) 200 and the underlying optimization analysis module(s) 106. The resultant optimization analysis class internal object is then bound to an appropriate optimization analysis module 106 for effecting the desired optimization analysis and data transfers across the analysis interface.

Optimization modules 106 provide, for example, higher-level analysis capabilities such as various optimizations in manufacturing system design, asset and resource allocations, etc. Optimization modules 106 are generally characterized by reliance on, and interaction with, solvers 102 for performance estimation. A generic example of an optimization module is one which examines a manufacturing system model and searches for a feasible reconfiguration of the manufacturing system model that will achieve some predefined performance objective (e.g. a target throughput, scrap rate, defect rate, asset utilization, etc.). In the process, optimization modules 106 may iteratively interact with solvers 102 to determine performance estimates of the reconfigured manufacturing system model. Such interaction is achieved internal to the isolation layer via internal objects. Multiple optimization modules may be implemented, which solve the same optimization analysis using disparate algorithms. The modeling isolation layer 100 defines the protocols by which the optimization modules 106 interact with the isolation layer 100. The isolation layer 100 includes an optimization analysis base class from which all optimization analysis modules of a particular type 106 are derived. New optimization analysis modules which implement the existing optimization analysis interface can be developed and readily integrated within a library architecture or network-enabled service as described herein above with respect to the other analysis module implementations. In general, new optimization analysis modules may be added to the library architecture by adding a new application program interface (API) component to define the end-user interface to the new optimization module, and a new optimization analysis interface to define how the new optimization module will interact with the isolation layer 100.

As described, the modeling isolation layer 100, solvers 102, model analysis modules 104 and optimization analysis modules 106 may share data with each other. The data passed between these various elements may include system models and other objects. The isolation layer 100 defines a common set of data structures and protocols used to pass this data between these elements.

As described above and in relation to the FIGURE, a method is described utilizing a descriptive representation of a manufacturing system, an analytical module, and an end-user application program configured to utilize an output of the analytical module to analyze performance of the manufacturing system. The method includes constructing the descriptive representation, selectively binding the descriptive representation to the analytical module using a software isolation layer, invoking the analytical module, and utilizing an output of the analytical module using the end-user application program. Constructing the descriptive representation can take a number of embodiments. One example includes constructing the descriptive representation using an end-user application program configured to construct the descriptive representation. Another example includes constructing the descriptive representation using a functional application programming interface (API, above) provided by the software isolation layer. This functional application programming interface can provide access to an object-based library that can be called by a variety of application programs.

The described analytical module, as described above and depicted by the FIGURE, can include one or more solver modules, one or more analysis modules, and one or more optimization modules, and combinations thereof. The output of the analytical module can be used according to a number of embodiments. According to one exemplary embodiment, the output can be used to reconfigure the modeled manufacturing system based output. Reconfiguring the manufacturing system can take a number of embodiments, including selecting configurable options, redesigning or retooling the manufacturing system, or other similar embodiments altering operation of the system. Another exemplary use of the output of the analytical module includes analyzing a plurality of manufacturing systems or production lines and comparing each of the plurality. A number of uses of the output are envisioned, and the disclosure is not intended to be limited to the particular exemplary embodiments described herein.

A variety of solver modules can be available to the analytical module. According to one exemplary embodiment, the analytical module examines the descriptive representation of the manufacturing system and selects or assists in the selection of a solver module or solver modules for use in analyzing the descriptive representation.

The above described software isolation layer serves to provide interfaces to and between end-user application programs. Through the software isolation layer, the end-user application programs can access the analysis capabilities described herein. Additionally, data can be transferred and/or collected for the purpose of reporting analysis results. The software isolation layer binds the descriptive representation to the analytical model by using internal objects that transform and marshal data between end-user application programs and the analytical model.

As described above, the isolation layer and analysis modules may reside on separate computers and utilize distributed grid computing and/or parallel processing. The end-user application program or programs can similarly reside on separate computers connected to the others by a network. Parallel processing is known in the art and describes a method to process a number of independent computational threads at the same time. Such threads can be processed through a unitary processor or can be divided into multiple cores or processors simultaneously. According to one exemplary embodiment, an optimization module can utilize parallel processing to subdivide analyzing into discrete portions and communicate each of the portions to a different solver module. Such solver modules, as described above, can reside on different computers or a plurality of computers. Similarly, a solver module can utilize parallel processing to process multiple computational threads simultaneously.

As described above, the optimization module can be used to reconfigure the descriptive representation of the manufacturing system to achieve a performance objective and/or allocate resources to the manufacturing system. In one exemplary configuration, the optimization module can interact with one or more distinct analytical modules that calculate estimates of system performance to support this reconfiguration.

The above methods describe utilizing data regarding a manufacturing system. The data can be manually entered, automatically collected through an automatic data collection method, or a combination of the two.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for analyzing performance of a manufacturing system, the method comprising:
    providing user class objects defined by a user at an end-user application program to a software isolation layer, each user class object specifying an underlying desired analysis capability to be effected at an analytical module that is decoupled from the end-user program;
    for each user class object provided by the software isolation layer, generating a corresponding class internal object allocated within the software isolation layer;
    constructing a descriptive representation of the manufacturing system;
    selectively binding the descriptive representation to the analytical module using an analysis module interface provided by the software isolation layer;
    invoking a plurality of analytical sub-modules of the analytical module each bound to corresponding ones of the class internal objects, each analytical sub-module effecting the underlying desired analysis capability specified by the user class object through the bound corresponding class internal object; and utilizing outputs of the analytical sub-modules using the end-user application program configured to utilize the outputs.

2. The method of claim 1, wherein the analytical module comprises at least one of:
   a solver module;
   an analysis module;
   an optimization module; and
   combinations of thereof.

3. The method of claim 2, wherein the analysis module validates the descriptive representation of the manufacturing system.

4. The method of claim 2, wherein the solver module calculates an estimation of manufacturing system performance.

5. The method of claim 2, wherein the optimization module reconfigures the descriptive representation of the manufacturing system to achieve a performance objective.

6. The method of claim 2, wherein the optimization module allocates resources to the manufacturing system.

7. The method of claim 2, further comprising reconfiguring the manufacturing system based on at least one of the outputs of the analytical sub-modules.

8. The method of claim 2, further comprising using at least one of the outputs of the analytical sub-modules to compare a performance of each of a plurality of production lines.

9. The method of claim 2, further comprising obtaining data through automatic data collection.

10. The method of claim 2, wherein the descriptive representation is constructed using the end-user application program configured to construct the descriptive representation.

11. The method of claim 2, wherein the application program interface is a functional application programming interface and the descriptive representation is constructed using the functional application programming interface provided by the software isolation layer.

12. The method of claim 11, wherein the functional application programming interface provides access to an object-based library that can be called by a variety of application programs.

13. The method of claim 2, wherein the isolation layer provides interfaces to and between the end-user application programs for accessing analysis capabilities and reporting analysis results.

14. The method of claim 2, wherein the binding is accomplished using internal objects that transform and marshal data between the end-user application programs and the analytical module.

15. The method of claim 2, wherein the end-user application programs, the isolation layer, and the analytical module reside on separate computers connected by a network.

16. The method of claim 2, wherein the analytical module further comprises a shared link library.

17. The method of claim 2, wherein the analytical module further comprises a network-enabled service in a distributed environment.

18. The method of claim 2, wherein the optimization module executes one of reconfiguring the descriptive representation of the manufacturing system to achieve a performance objective and allocating resources to the manufacturing system; and
   wherein the analytical module comprising the optimization module interacts with one or more distinct analytical sub-modules that calculate estimates of system performance.

19. The method recited in claim 2, wherein the plurality of analytical sub-modules of the analytical module:
   examines the descriptive representation; and
   assists in selection of various compatible solver modules.

20. The method of claim 1, wherein the plurality of analytical sub-modules of the analytical module comprises:
   a plurality of solver modules located on a plurality of computers; and
   an optimization module utilizing parallel processing to subdivide the analyzing into discrete portions and communicate the discrete portions to each of the plurality of solver modules.

21. The method of claim 1, wherein the analytical module comprises a solver module utilizing parallel processing.

* * * * *